Dec. 12, 1933.   F. D. WILSON   1,938,882
MOWER ATTACHMENT FOR ROAD MACHINES
Filed April 13, 1928   3 Sheets-Sheet 1
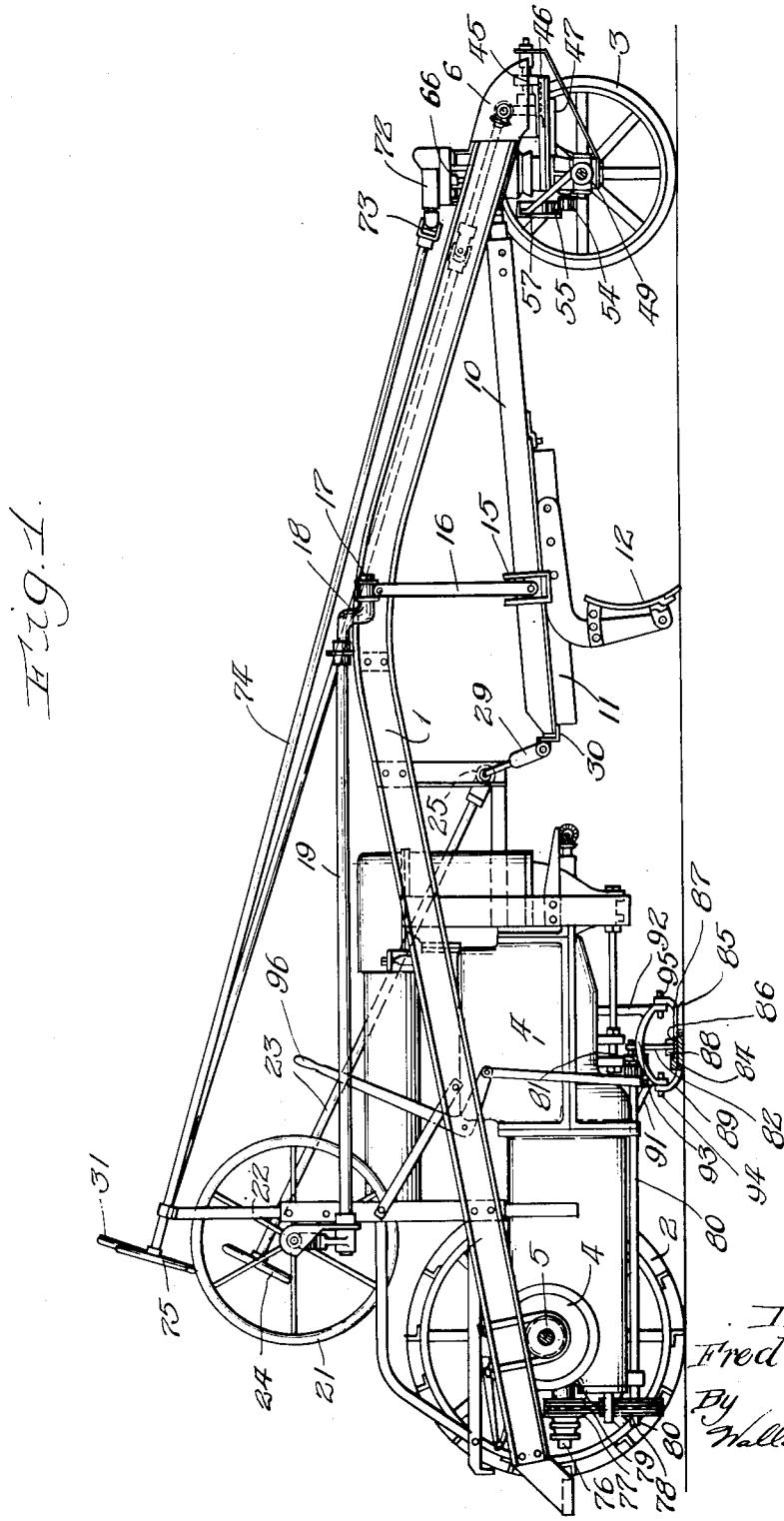

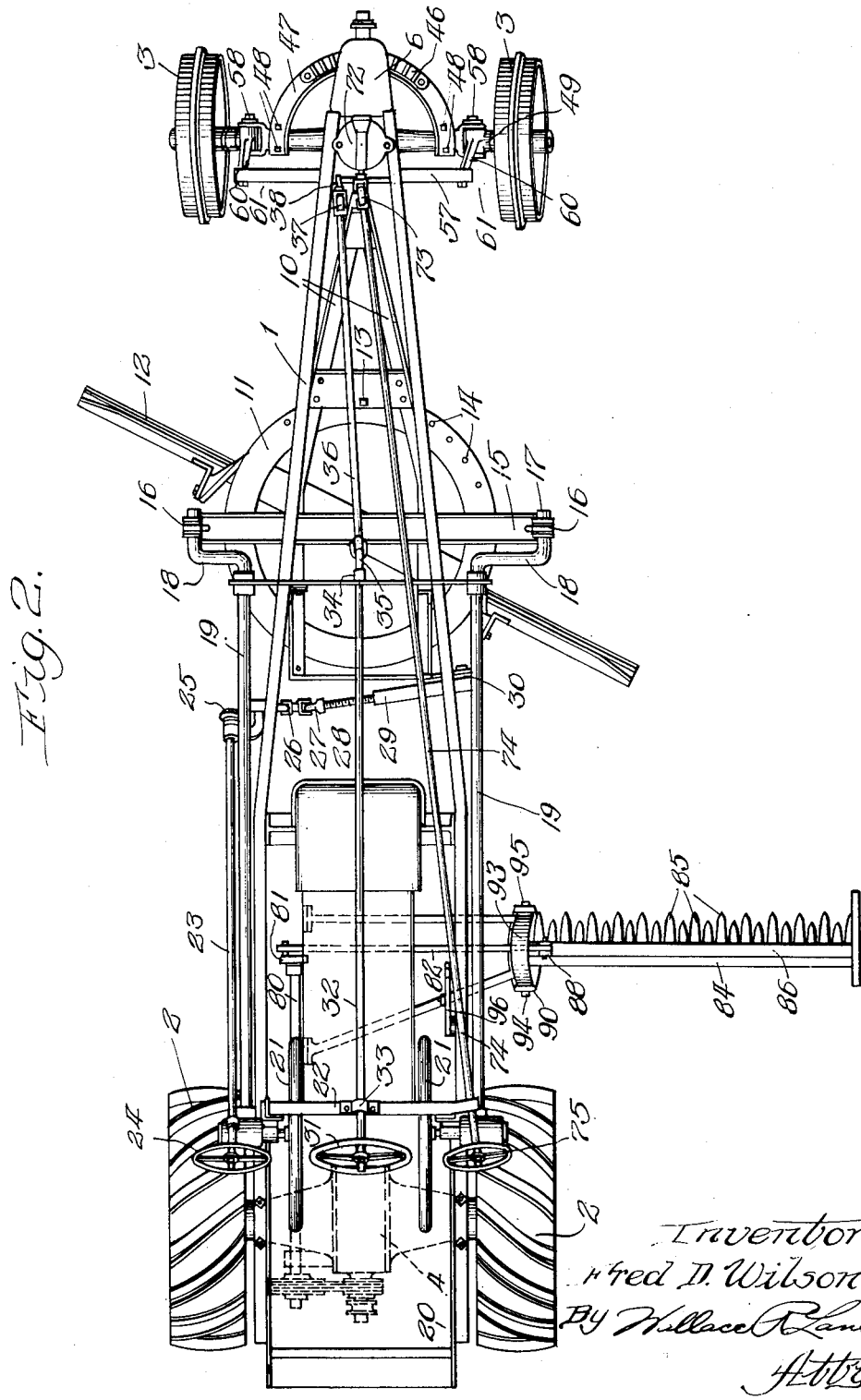

Dec. 12, 1933.  F. D. WILSON  1,938,882
MOWER ATTACHMENT FOR ROAD MACHINES
Filed April 13, 1928   3 Sheets-Sheet 3
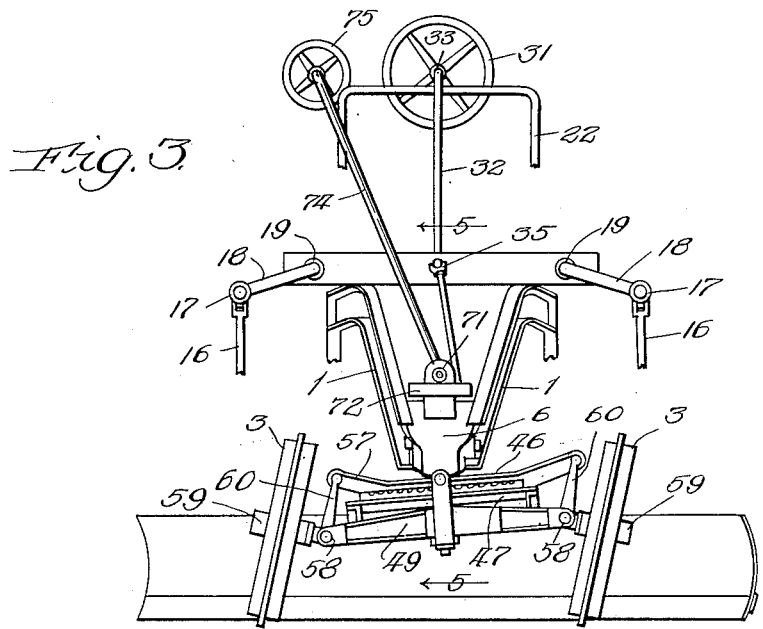
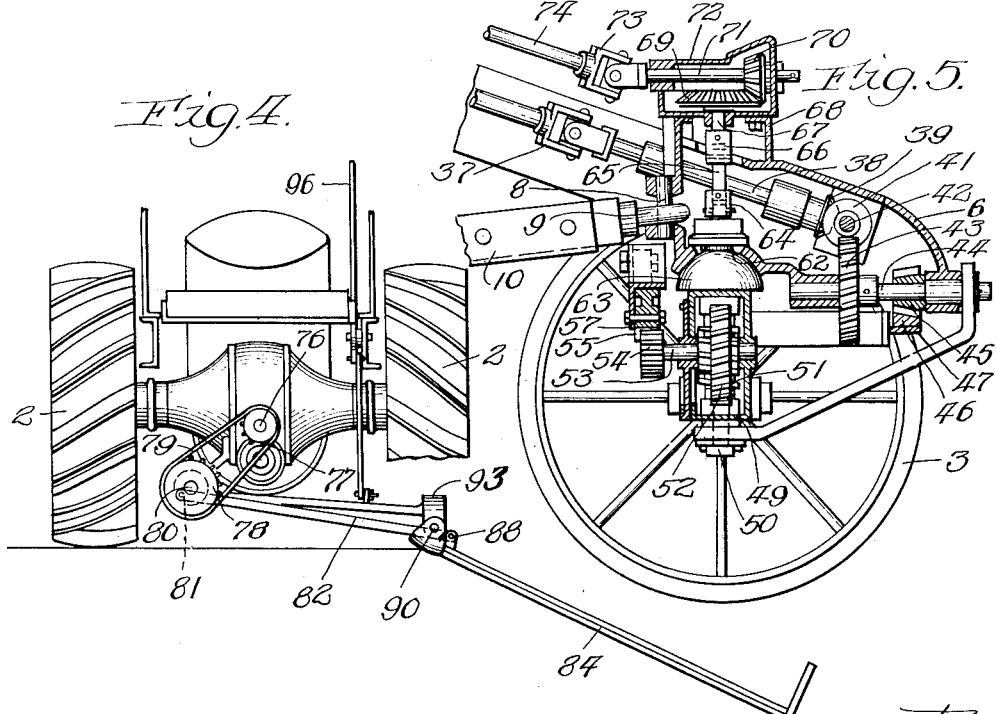

Patented Dec. 12, 1933

1,938,882

UNITED STATES PATENT OFFICE 1,938,882

MOWER ATTACHMENT FOR ROAD MACHINES

Fred D. Wilson, Harvey, Ill., assignor to The Austin Manufacturing Company, Chicago, Ill., a corporation of Illinois Application April 13, 1928. Serial No. 269,670

4 Claims. (Cl. 56—25)

This invention relates to road machines, and more particularly to the provision of a mower attachment for said road machine for mowing and cutting grass, weeds and the like at the side of the roadway, or for cutting crops.

Among the objects of my invention are to provide a mowing or cutting device attached to the prime mover of a road machine; further to provide a road machine having an exceptionally long wheel base and thus making possible the provision of a longer cutting bar than is possible on a short wheel base; further to provide a mowing or cutting attachment that may assume an angular position when mowing grass, weeds or the like at the side of the roadway; further to provide a road machine supported in a long forwardly extending frame, said frame being equipped at its front end with a pair of steerable and tiltable supporting wheels for steering the machine, the leading supporting wheels adapted to resist the tendency of the side draft set up by the machine; further to provide a mowing or cutting attachment of maximum simplicity, efficiency, economy and ease of operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings;

Fig. 1 is a view in side elevation with the wheels removed and Fig. 2 is a plan view of my improved mowing device as attached to a road machine.

Fig. 3 is a fragmentary view in front elevation showing the front wheels in inclined position.

Fig. 4 is a view in rear elevation showing the means of driving the mowing attachment and the position that the mowing blade may assume at times.

Fig. 5 is a detailed, vertical sectional view on line 5—5 of Fig. 3.

Referring to the drawings, the road machine comprises an arched frame 1. This frame is cut out angularly pointed at its forward end and is supported at its opposite ends by the driving wheels 2 and the forward or driven wheels 3. The rear or driving wheels 2 are driven by an internal combustion engine or other prime mover 4 through the means of a rear axle 5. The forward end of the frame 1 terminates in a housing 6, the housing being held in position by any suitable means such as bolts or the like. At the rear of the housing 6 is a vertical pivot 8 forming a boring for the ring 9 at the forward end of the triangular frame 10 which carries at its rear portion a blade carrying circle 11 to which is suitably attached a blade 12. The circle 11 and blade 12 are adjustable in angular position by means of a locking pin 13 supported in the frame 10 by means of registering holes 14 in the circle 11 rigidly secured to the triangular frame 10 and extending across the frame is a bar 15. Rising from each end of this bar is a connection rod 16 pivotally attached at its opposite end to the crank pin 17 carried by a crank 18 on a horizontally disposed shaft 19, extending back to a point in proximity to the operator's station or platform 20 at the rear of the engine. The shaft 19 is at this point provided with an independent hand wheel 21 for operating it.

Mounted in the frame 22 and adjacent to the operator's station, is a downwardly and angularly disposed shaft 23, attached to which at the operator's station is a hand wheel 24. The shaft 23 terminates at its lower end in gearing 25 driving a horizontal shaft 26 adjacent to the rear of the triangular frame 10. Shaft 26 is attached to a universal joint 27 through a screw 28 turning in a block 29 pivotally connected to the triangular frame 10 at 30 the result being that when the operator manipulates the hand wheel 24 he rotates the screw 28 in the block 29 thus moving the frame 10 and consequently the blade 12 in a horizontal plane about the pivot 8. The universal joint 27 and pivotal connection 30 are so constructed so as not to interfere with vertical movement of the blade 12.

At the rear of the road machine and adjacent to the operator's station is a steering wheel 31 mounted on a downwardly inclined shaft 32 journaled in frame bearings 33 and 34. The lower end of the shaft 32 carries a universal joint 35 on a rod 36 connected on its opposite lower end through a universal joint 37 on a comparatively short shaft 38 suitably journaled in the housing 6. On the extreme lower end of the shaft 38 is a bevelled gear 39 connecting with another bevelled gear 40 driving the worm 41 on the worm shaft 42 suitably journaled in the housing 6. Worm 41 meshes with a worm wheel 43 carried by a shaft 44 also journaled in the housing 6. On this shaft 44 is a bevelled gear 45 fitting with and driving an arcuate rack 46 rigid upon and consequently driving the horizontal gear wheel 47 rigidly secured by any suitable means, such as, the bolts 48, to the front axle 49 from the machine. The front axle 49 rotates in a horizontal plane about a vertically disposed shaft 50, itself rotatable in suitable supporting parts of the housing 6. The shaft 50 carries a worm 51 connecting with a vertically disposed worm wheel 52 on shaft 53, carrying a pinion 54, meshing with a curved segmental rack 55, rigidly secured on the underside of a horizontally disposed link or bar 57. Each end of the axle 49 is equipped with a conventional horizontal pivot 58 on which is journaled a horizontal stub shaft 59 bearing the adjacent front wheel 3. Rigid with each stub shaft 59 and vertically extending from a point near the adjacent pivot 58 is a vertical arm 60. The upper end of the arm 60 has a pivotal connection 61 with the adjacent end of bar or link 57. The result of the construction just described is that rotation of the shaft 50 to thereby cause pinion 54 to traverse rack 55, moves the bar 57 lengthwise of the axle 49 thus within predetermined limit tilting or inclining wheels 3, the direction of inclination depending upon the direction of rotation of the shaft 50 and the amount of inclination depending on the extent of such rotation.

The tilting of the wheels 3 results in a corresponding tilting of the axle 49 and the link or bar 57 about the normal vertical axis of shaft 50 through housing 6. This movement is provided for by connecting shaft 50 to the housing 6 through a more or less conventional ball joint bearing 62 and 63 which allows a possible rocking movement.

In order to permit of the operator's rotating shaft 50 in all inclined positions of the wheels 3, shaft 50 is connected at its upper end to a universal joint 64 carried by a short shaft 65 in turn connected through another universal joint 66 to a short vertical shaft 67 journaled in an upward extension 68 of the housing 6. At the upper end of shaft 67 is a bevel gear 69, meshing with a bevelled pinion 70 on a shaft 71 contained within a supplemental housing 72. Outside of housing 72, a shaft 71 is connected by a universal joint 73 to an inclined shaft 74 terminating at its upper end in a hand wheel 75 located immediately adjacent to the operator's station and in the particular case here illustrated on the opposite side from a wheel 24.

Thus the operator can, from his position at the rear of the machine, manipulate a hand wheel 75 to rotate shaft 50 in the proper direction and to the proper extent to incline the wheels 3 and to produce straight travel of the machine along the road, this notwithstanding the tendency of the machine under the power of the engine or prime mover in the absence of a guiding tractor, to cut into the side of the bank or slope and remain there.

Attached to the driving shaft of the prime mover by suitable gearing, is a shaft 76 to which is attached a sprocket wheel 77. Disposed below the sprocket wheel 77 and to one side thereof is another sprocket wheel 78 operatively connected to the sprocket wheel 77 by means of a sprocket chain 79. The sprocket wheel 78 drives the horizontally disposed shaft 80 for operating the mowing or cutting attachment. Attached to the forward end of the shaft 80 is a crank disc 81 to which is attached an arm 82. A mowing or cutting attachment 83 comprises a lower stationary plate 84 provided with sharp projections or cutting edges 85, and an upper plate 86 provided with sharp projections or cutting edges 87. The upper plate 86 is connected to the arm 82 by means of a pin 88 or the like. Thus as the crank disc 81 is rotated, it imparts movement to the arm 82 which arm in turn moves the plate 86. As the movable plate 86 is moved over the stationary plate 84, the sharpened edges of these two plates or cutting bar will provide a cutting action. The lower stationary plate 84 is rigidly attached to the base 89 of the yoke 90, carried by the stationary plate 84, and the support member 93 is attached to the housing of the engine or prime mover 4 by means of the arms 91 and 92. The upper member 93 and lower member 89 of the yoke 90 are pivotally connected together by the pins 94 and 95 so that the mowing blade may assume an angular position to the body of the road machine, as more clearly disclosed in Fig. 4 of the drawings. A lever arm 96 of any well known construction is provided for raising or lowering the yoke 90 from a ground contacting position. When it is desired to raise the cutter and yoke, the cutter is lifted to a vertical position and the lever arm is manipulated to raise the yoke and cutter.

By the use of the mowing or cutting attachment with a road machine of the type described, it is possible to provide a blade of much greater length than is possible with the present type of engine or other mechanism that is used in connection with a mowing or cutting device. Furthermore, as is well known, all cutters or mowing bars operating to one side of the controlling vehicle set up more or less side draft depending upon the quantity and position of the material cut, and this side draft is, of course, less noticeable with the bars applied to a machine having a long wheel base, than when applied to an ordinary tractor, and thus it is possible to successfully handle a longer bar than is possible on a short wheel base. Another feature of importance is the provision of the leaning or tiltable front wheels as shown on my road machine. These tiltable and adjustable front wheels are able to resist a greater amount of side draft without losing their position than a pair of straight wheels.

Having now disclosed my invention, I claim:

1. In a road machine, a frame, wheels supporting the same, a prime mover carried by said frame, support means, a mowing attachment extended laterally with respect to said frame and to the rear thereof and pivoted at one end to said support means, the other end being free to move about so as to be in a plane parallel with the road side and at an angle above and below the plane of the road bed, and means for inclining the front wheels at different angles whereby to resist the side draft caused by the mowing attachment when operating at the side of the road bed.

2. In a road machine, a frame, wheels supporting the same, means for inclining the forward wheels at different angles whereby to resist side draft upon the machine, a prime mover carried by said frame, a mowing attachment located in a plane below and operatively connected with said prime mover, and means for supporting said mowing attachment adjacent the rear portion of said frame so that it extends laterally with respect to said frame, said mowing attachment being free to assume positions above and below the plane of this supporting means, said frame extending a substantial distance in advance of the mowing attachment so as to minimize the effect of side draft while the mowing attachment is in operation.

3. In a road machine, a frame, wheels supporting the same, means for inclining the forward wheels at different angles whereby to resist side draft upon the machine, a prime mover carried by said frame, a rigidly sustained support member, a mowing mechanism extending laterally from and adjacent the rear of said frame and having a yoke at one end pivotally engaging the support member, the other end being free to move above and below the plane of the pivotal connection while the machine is in operation on a road side.

4. In a road machine, a frame, wheels supporting the same, means for inclining the forward wheels at different angles whereby to resist side draft upon the machine, a prime mover carried by said frame, a mowing attachment located in a plane below and operatively connected with said prime mover, means for supporting the said mowing attachment so that it extends laterally with respect to the frame, said frame extending a substantial distance in advance of the mowing attachment so as to minimize the effect of the side draft while the mowing attachment is in operation.

FRED D. WILSON.